United States Patent [19]

Neto

[11] Patent Number: 6,013,342
[45] Date of Patent: Jan. 11, 2000

[54] SELF-ADHESIVE SHEET WITH NON-SLIP PROPERTIES

[75] Inventor: Rafael Lettiere Neto, Rio de Janeiro, Brazil

[73] Assignee: Industria E Comercio Textil Avanti Ltda., Rio de Janeiro, Brazil

[21] Appl. No.: 08/817,388
[22] PCT Filed: Oct. 19, 1995
[86] PCT No.: PCT/BR95/00046
§ 371 Date: Jul. 21, 1997
§ 102(e) Date: Jul. 21, 1997
[87] PCT Pub. No.: WO96/12844
PCT Pub. Date: May 2, 1996

[30] Foreign Application Priority Data

Oct. 20, 1994 [BR] Brazil ..................................... 9404171

[51] Int. Cl.[7] ......................................................... B32B 5/18
[52] U.S. Cl. ........................ 428/40.1; 428/42.1; 428/95; 428/96; 428/137; 428/314.4; 428/314.8; 428/317.1; 428/317.5
[58] Field of Search ................................. 428/40.1, 42.1, 428/95, 96, 137, 314.4, 314.8, 317.1, 317.5; 156/71

[56] References Cited

U.S. PATENT DOCUMENTS

| | | | |
|---|---|---|---|
| 3,583,890 | 6/1971 | Klockmann | 428/95 |
| 4,522,857 | 6/1985 | Higgins | 428/95 |
| 4,578,300 | 3/1986 | Merlet | 428/91 |
| 4,647,484 | 3/1987 | Higgins | 428/95 |
| 4,705,715 | 11/1987 | DeCoste, Jr. et al. | 428/319.9 |
| 4,824,498 | 4/1989 | Goodwin | 428/95 |
| 4,990,399 | 2/1991 | Hoopengardner | 428/95 |

FOREIGN PATENT DOCUMENTS

| | | |
|---|---|---|
| 44 00 758 | 8/1994 | Germany . |
| 920078 | 3/1963 | United Kingdom . |
| 2 125 334 | 3/1984 | United Kingdom . |

*Primary Examiner*—Nasser Ahmad
*Attorney, Agent, or Firm*—Smith, Gambrell & Russell, LLP

[57] ABSTRACT

A self-adhesive sheet is described for multiple uses and especially as a carpet liner or an acoustic coating. The sheet includes a base sheet in the form of a polypropylene web, a thin coating of natural or synthetic non-slip material such as latex foam adhered to one side of the base sheet, a coating of adhesive applied to the other side of the base sheet, and a protector sheet covering the adhesive coating, which may be peeled off to make the sheet self-adhesive. Preferably, the foam coating is provided with a pattern in relief to ensure a relatively bodied structure in relation to the weight of latex used as well as an agreeable appearance. The self-adhesive sheet is light, flexible and easily handled and it may be cut to the desired size and shape using scissors or the like.

21 Claims, 2 Drawing Sheets

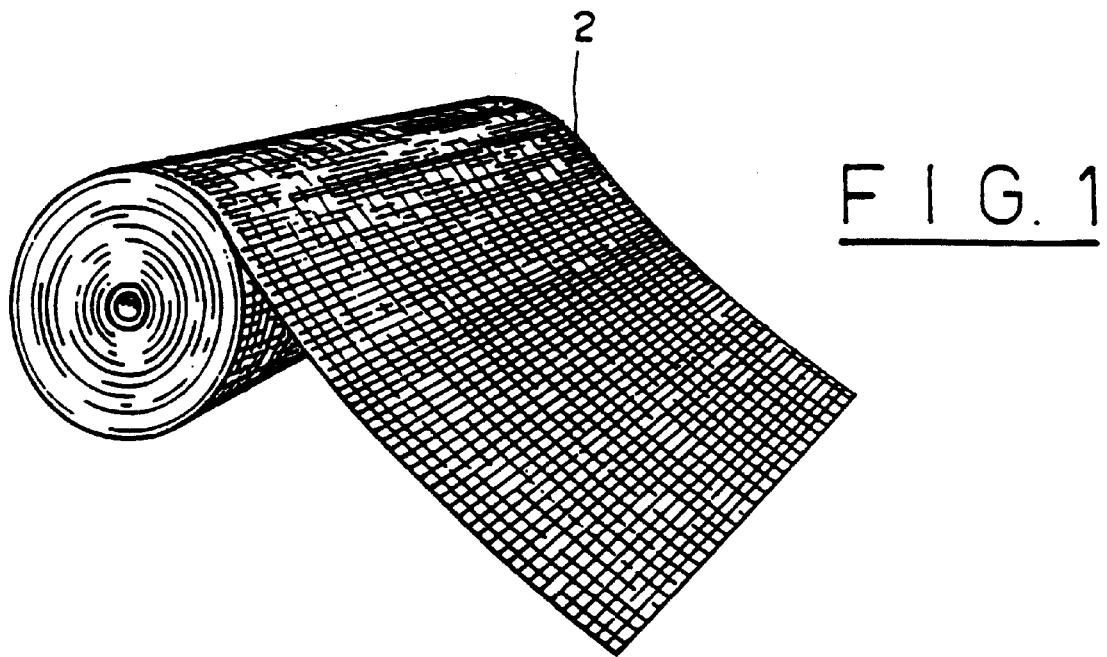
F I G. 1
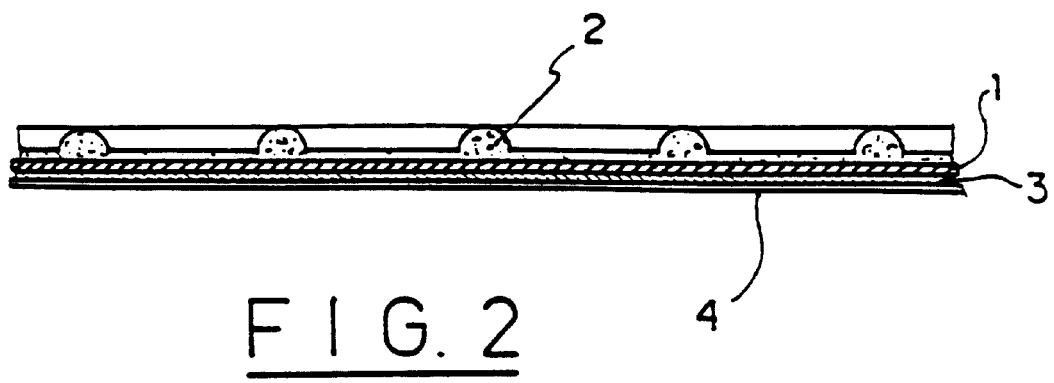
F I G. 2

SELF-ADHESIVE SHEET WITH NON-SLIP PROPERTIES

The present invention refers generally to a self-adhesive sheet and more particularly to such a sheet having anti-slip and acoustic properties, which is suitable, for example, for using as a non-slip underlay or liner for carpets, rugs, mats and the like.

BACKGROUND OF THE INVENTION

It is known to apply a layer of open cell thermoplastic foam to the underside of carpets to provide them with non-slip properties. A specific example is the liner disclosed in DE 1560752) (D-S Chemie & Co.). Anti-slip liners are also known which are in the form of open screens and may be stitched to the underside of carpets, as also is a composite liner having outer layers sandwiching a layer of Kraft paper (JP 5237974 in the name of Kanzaki Manufacturing Co. Ltd.). A liner of natural or synthetic latex foam applied directly to the underside of carpets is also known from DE 2028624 (Centrans GmbH).

SUMMARY OF THE INVENTION

The present invention seeks another more universal solution for providing carpets and the like with non-slip properties, by means of a multi-use self-adhesive sheet that comprises a base sheet having first and second sides, a coating of natural or synthetic material having non-slip characteristics adhered to the first side of the base sheet, a self-adhesive coating applied to the second side of the base sheet and a protector sheet covering the adhesive coating and peelable therefrom to make the sheet self-adhesive.

The base sheet may be made of any suitable material but preference is given to a woven polypropylene screen due to its low cost, its bi-directional resistance to stretching and its reduced weight. Other materials include nylon cloth, gabardine or polyester, poplin, Ketsturn or Raschel cloth and, in general, strong light weaves of suitable widths, such as 2.40 to 5.00 m.

The thickness of the sheet may vary, it generally being between 0.15 and 0.35 mm. More particularly, thickness would be: white screen—preferably 0.20 mm, but in general between 0.15 and 0.25 mm; cotton—0.25 to 0.30 mm; and other materials—in the larger range mentioned above, depending on the properties of the material and the characteristics desired for the product.

Although the base sheet may be a continuous sheet, it may adequately be in the form of an open grid or net which reduces cost without any substantial loss in efficiency of the final product. The materials may be the same as those mentioned above.

Although the coating of non-slip material may be in any suitable form, foams and particularly closed cell foams are preferred. Natural or synthetic latex is suitable. The coating may be provided (for example, by means of engraving rolls) with a relief, preferably grid-like, pattern which results in both a relatively bodied structure in relation to the quantity of latex employed and an agreeable appearance. The thickness of the foam coating may be small, for example, between 1.0 and 2.5 mm.

When the base sheet is itself an open grid-like net of polypropylene or the like, the foam coating will adhere to the first side of the individual grid elements and, since there are spaces therebetween, the foam will automatically assume an open grid configuration itself which corresponds to the grid of the base sheet.

The protector sheet would normally be paper having suitable strength and thickness, the latter being typically between 0.15 and 0.25 mm. The weight of the paper is suitably between 40 and 60 g/m$^2$.

The adhesive may have a thickness in the range of approximately 0.05 to 0.08 mm and a weight of 40 to 60 g/m$^2$. It preferably comprises an acrylic adhesive such as is available from 3M (Minnesota Mining and Manufacturing Company) or BASF.

A self-adhesive sheet having the above mentioned preferred properties is light (in the general range of about 500 to 800 g/m$^2$ when the base sheet is a continuous sheet) and flexible and it may be marketed in sheets or rolls which are easily cut by scissors or the like so as to obtain the desired size or shape and, once the protector sheet has been peeled off, it may be adhered to any desired surface. For example, apart from being used as a liner for carpets, it could be used as an underlay for pots of plants, for protecting the under surface of small objects, as an acoustic covering for walls and for numerous other purposes.

In a presently preferred embodiment when the base sheet has an open grid-like structure (for example, polypropylene raffia) as mentioned above, the economy of material (foam and adhesive) is considerable compared with the continuous base sheet embodiment discussed above.

BRIEF DESCRIPTION OF THE DRAWINGS

The invention will be better understood from the following detailed description, given by way of example and with reference to the accompanying drawings in which:

FIG. 1 is a perspective view of a roll of a sheet of self-adhesive material according to a first preferred embodiment of this invention;

FIG. 2 is a section through the sheet shown in FIG. 1, illustrating its composite structure.

DETAILED DESCRIPTION OF THE INVENTION

Figure 3:
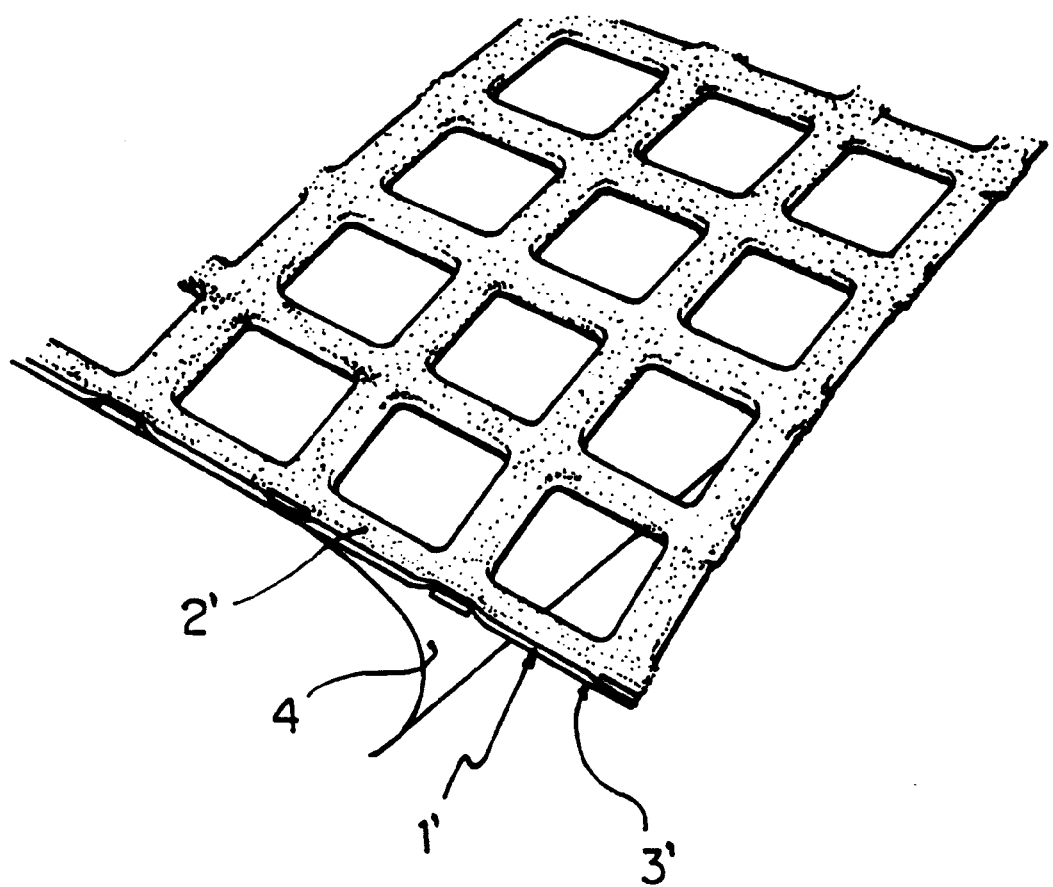
FIG. 3 is a perspective view with a detail in section, of a second preferred embodiment of the invention.

Referring now to the drawings, a self-adhesive sheet according to a preferred embodiment of this invention comprises a base sheet 1 in the form of a thin woven web of polypropylene raffia having a thickness of about 0.2 mm. On one side of web 1 a coating 2 of approximately 1.3 mm of natural latex closed cell foam, based on 350 to 450 g/l of raw liquid foam, is applied. Latex coating 2 is formed, for example by passing between engraving rolls, with a quadriculated, ribbed or similar relief pattern which provides the product with a visible surface having non-slip and acoustic properties. Although a latex foam is presently preferred, other foams that provide the product with anti-slip properties may be used. Examples include polyurethane or PVC foams, this including recycled polyethylene or other suitable foamable materials. Closed cell foams have been found to be preferable since they have superior anti-slip properties when compared with open cell foams of the same material.

The other side of web 1 is coated with a coating 3 of acrylic type adhesive (manufactured by 3M, BASF or the like). in its turn, coating 3 is covered by a peelable protector sheet 4 of Kraft paper or the like, the surface in contact with the adhesive thereof being treated or coated so that it can be easily freed or peeled off the product prior to use.

The above described sheet is easily handled, is flexible and light, about 600 g/m$^2$, and may be cut with scissors or the like to obtain the desired size and shape. When the sheet is used as a liner or underlay for a carpet, it can either be cut into several strips to be adhered to the underside of the carpet or it can be cut as a single piece substantially the same size as the carpet.

Obviously, it is not essential that the latex foam layer be formed with a relief pattern and it may have a constant thickness. However, the application of a relief pattern results in an economy of latex without compromising the structure of the product and, moreover, it results in an agreeable appearance, especially when the product is used with the foam visible as in the case of an acoustic coating.

As already mentioned, the material of the base web 1 is not necessarily made of woven polypropylene which is, however, preferred due to its low cost and weight as well as to satisfactory bi-directional stretch resistance. Other suitable materials include, for example, natural or synthetic fibre materials, it being sufficient that they provide the product with suitable strength and permit adherence to its respective sides of the foam and adhesive.

A second embodiment of the invention, illustrated in FIG. 3, comprises an adhesive sheet similar to that shown in FIGS. 1 and 2 except for the fact that the base sheet 1' comprises a polypropylene raffia of open grid-like structure with the result that the foam coating 2' and the adhesive coating 3' both cover only their respective sides of the relatively flat grid elements 5 of the base sheet. The protector sheet 4', however, may be identical to protector sheet 4 of the first embodiment, i.e. a continuous sheet. This has proved not only to result in a product having an efficiency as a carpet underlay almost identical to that of the first embodiment, but also uses smaller amounts of materials for the base sheet and the foam and adhesive coatings which brings substantial economy.

In the case of the second embodiment the weight of the finished product may typically be from 220 to 290 g/m$^2$, 50 a 70 g/m$^2$ being the weight of the grid-like base sheet 1', 130 a 150 g/m$^2$ being the weight of the latex foam, 5 to 7 g/m$^2$ the weight of the acrylic adhesive and 40 to 60 g/m$^2$ being the weight of the peelable protector sheet 4'.

I claim:

1. Self-adhesive non-slip sheet material for attachment to carpets to prevent the slippage of carpets, comprising:
   a) a base sheet having first and second sides;
   b) a thin coating having a thickness of 1.0 mm to 2.5 mm of natural or synthetic closed cell foam material having non-slip characteristics, adhered to the first side of the base sheet, said coating having an exposed non-slip surface and being provided with a relief pattern;
   c) a self-adhesive coating applied to the second side of the base sheet; and
   d) a protector sheet covering the adhesive coating, peelable therefrom to make the coating sheet self-adhesive.

2. Self-adhesive non-slip sheet material for preventing the slippage of carpets according to claim 1, wherein the base sheet is a polypropylene web.

3. Self-adhesive non-slip sheet material for preventing the slippage of carpets according to claim 1, said material having a weight of approximately 500 to 800 g/m$^2$.

4. Self-adhesive non-slip sheet material for preventing the slippage of carpets according to claim 1, wherein the base sheet has an open grid structure formed of grid elements and that said non-slip coating is adhered to said first side of the grid elements and said adhesive coating is adhered to said second side of said grid elements, both said coatings consequently also having an open grid structure corresponding to that of the base sheet.

5. Self-adhesive non-slip sheet material for preventing the slippage of carpets according to claim 4, said material having a weight of from 220 to 290 g/m$^2$.

6. Self-adhesive non-slip sheet material for preventing the slippage of carpets according to claim 1, wherein the coating of non-slip material includes latex foam.

7. Self-adhesive non-slip sheet material for preventing the slippage of carpets according to claim 6, wherein the base sheet is a polypropylene web.

8. Self-adhesive non-slip sheet material for preventing the slippage of carpets according to claim 6, said material having a weight of approximately 500 to 800 g/m$^2$.

9. Self-adhesive non-slip sheet material for preventing the slippage of carpets according to claim 6, wherein the base sheet has an open grid structure formed of grid elements and that said non-slip coating is adhered to said first side of the grid elements and said adhesive coating is adhered to said second side of said grid elements, both said coatings consequently also having an open grid structure corresponding to that of the base sheet.

10. Self-adhesive non-slip sheet material for preventing the slippage of carpets according to claim 9, said material having a weight of from 220 to 290 g/m$^2$.

11. Self-adhesive non-slip sheet material for preventing the slippage of carpets according to claim 1, wherein the coating of non-slip material includes a polyurethane foam.

12. Self-adhesive non-slip sheet material for preventing the slippage of carpets according to claim 11, wherein the base sheet is a polypropylene web.

13. Self-adhesive non-slip sheet material for preventing the slippage of carpets according to claim 11, said material having a weight of approximately 500 to 800 g/m$^2$.

14. Self-adhesive non-slip sheet material for preventing the slippage of carpets according to claim 11, wherein the base sheet has an open grid structure formed of grid elements and that said non-slip coating is adhered to said first side of the grid elements and said adhesive coating is adhered to said second side of said grid elements, both said coatings consequently also having an open grid structure corresponding to that of the base sheet.

15. Self-adhesive non-slip sheet material for preventing the slippage of carpets according to claim 14, said material having a weight of from 220 to 290 g/m$^2$.

16. Self-adhesive non-slip sheet material for preventing the slippage of carpets according to claim 1, wherein the coating of non-slip material includes a PVC foam.

17. Self-adhesive non-slip sheet material for preventing the slippage of carpets according to claim 16, wherein the base sheet is a polypropylene web.

18. Self-adhesive non-slip sheet material for preventing the slippage of carpets according to claim 16, said material having a weight of approximately 500 to 800 g/m$^2$.

19. Self-adhesive non-slip sheet material for preventing the slippage of carpets according to claim 16, wherein the base sheet has an open grid structure formed of grid elements and that said non-slip coating is adhered to said first side of the grid elements and said adhesive coating is adhered to said second side of said grid elements, both said coatings consequently also having an open grid structure corresponding to that of the base sheet.

20. Self-adhesive non-slip sheet material for preventing the slippage of carpets according to claim 19, said material having a weight of from 220 to 290 g/m$^2$.

21. Self-adhesive non-slip sheet material for attachment to carpets to prevent the slippage of carpets, comprising:

a) a base sheet having first and second sides, said base sheet having an open structure formed of grid elements;
b) a thin coating having a thickness of 1.0 mm to 2.5 mm of natural or synthetic closed cell foam material having non-slip characteristics, adhered to the first side of the grid elements on the base sheet, said coating being provided with a relief pattern;
c) a self-adhesive coating applied to the grid elements on the second side of the base sheet; and
d) a protector sheet covering the adhesive coating, peelable therefrom to make the coating sheet self-adhesive; both said coatings having grid elements corresponding to those of the base sheet, said non-slip coating being adhered to said first side of the grid elements and said adhesive coating being adhered to the second side of said grid elements.

* * * * *